United States Patent [19]

Rice

[11] Patent Number: 4,777,854
[45] Date of Patent: Oct. 18, 1988

[54] DIMENSIONAL CUTTING TOOL FOR WOOD

[76] Inventor: Verle L. Rice, 700 S. Halsey, Harrisonville, Mo. 64701

[21] Appl. No.: 53,822

[22] Filed: May 26, 1987

[51] Int. Cl.⁴ .............................................. B26D 7/06
[52] U.S. Cl. .................................... 83/425.4; 83/504; 144/117 R; 144/242 C; 144/246 D; 144/375; 144/376
[58] Field of Search .................... 144/2 R, 114, 117 R, 144/129, 242 R, 242 C, 246 R, 246 D, 363, 375, 376, 378; 83/425.3, 425.4, 481, 498, 504

[56] References Cited

U.S. PATENT DOCUMENTS

| | | | |
|---|---|---|---|
| 2,651,335 | 9/1953 | Stagg | 83/425.3 |
| 3,141,482 | 7/1964 | Anness | 83/425.3 |
| 3,275,045 | 9/1966 | Beeley | 83/425.4 |
| 4,394,878 | 7/1983 | Rice et al. | 144/117 R |

Primary Examiner—W. Donald Bray
Attorney, Agent, or Firm—Kokjer, Kircher, Bradley, Wharton, Bowman & Johnson

[57] ABSTRACT

A dimensional cutting tool for flat wood stock is the subject of the present invention. The cutting tool comprises a table structure, the flat surface of which is movable vertically to accommodate varying thicknesses of wood. Two or more circular saw blades are movably attached to a horizontal shaft above the table surface and may be positioned anywhere along the length of the shaft. When wood stock is to be cut, the table surface height is appropriately adjusted and the saw blades positioned at the desired cutting locations. First and second power feed rollers, driven by an electric motor and drive belt assembly, feed wood stock through the machine, thus providing precise feeding of the wood both into and away from the blades. Additionally, the cutting head can be replaced with a planing or molding head without further modification of the tool.

5 Claims, 1 Drawing Sheet

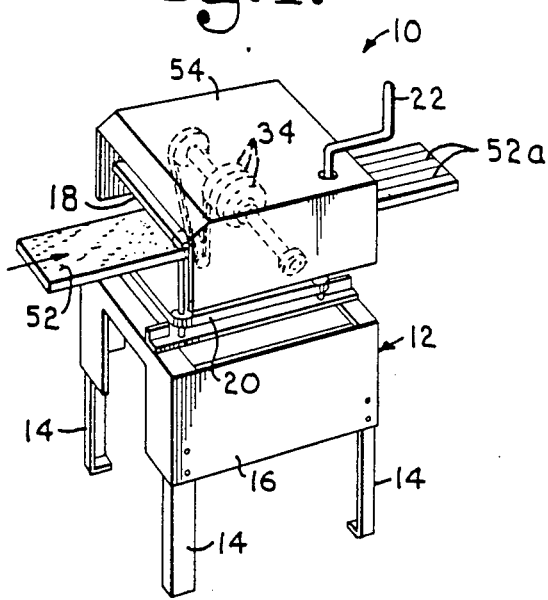
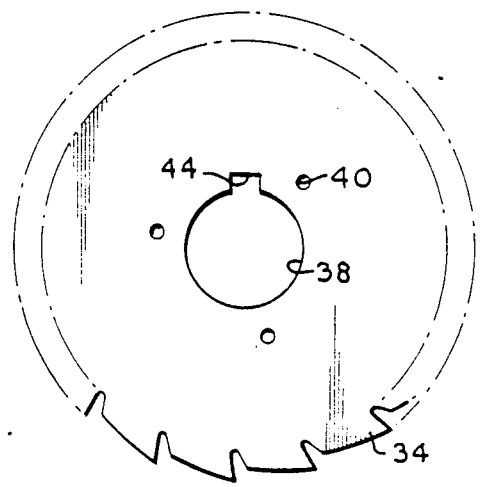
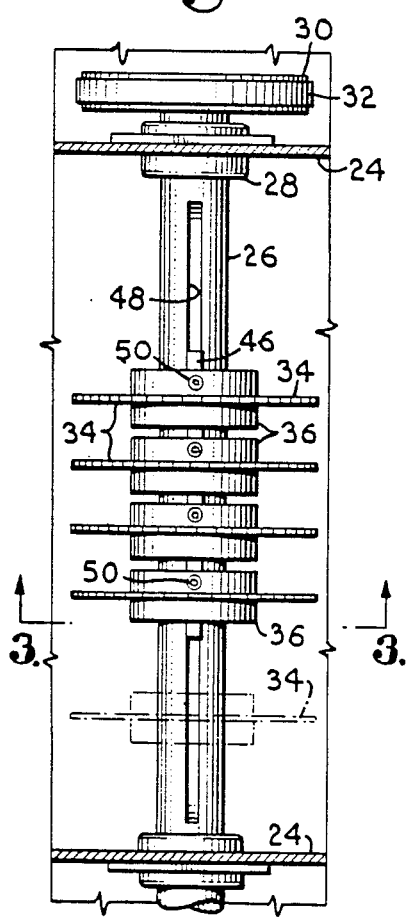
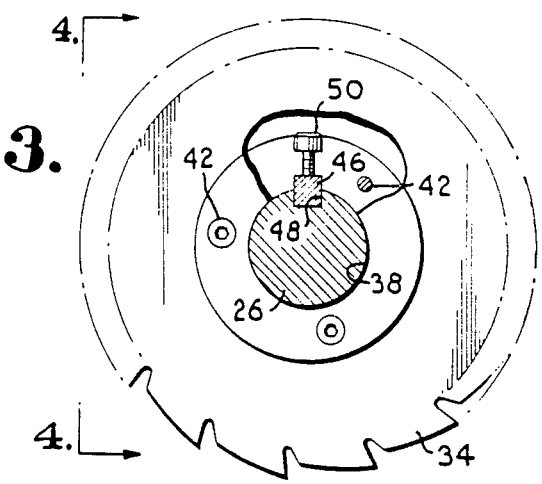
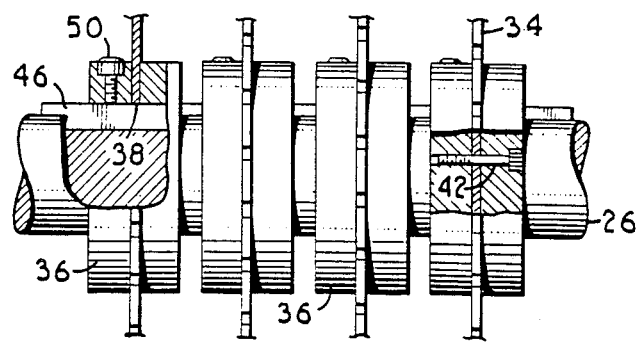

4,777,854

DIMENSIONAL CUTTING TOOL FOR WOOD

This invention relates generally to woodworking equipment and, more particularly, to a dimensional cutting tool for flat wood stock.

Circular table saws are well known in the woodworking art. In some cases, multiple blades are mounted on a common shaft so as to permit a single pass of the saw to cut flat stock into three or more pieces. It is also known to utilize wood planars of the type shown and described in U.S. Pat. No. 4,394,878 which is specifically incorporated herein by reference. It is felt that various advantages could result from combining the positive roller drive mechanism as disclosed in the referenced patent with a dimensional cutting tool having circular saw blades mounted above the supporting surface so as not to interfere with use of the surface for other woodworking activities.

It is, therefore, a primary object of the present invention to provide a dimensional cutting tool designed to function as an accessory for a wood planar/molder of the type disclosed in U.S. Pat. No. 4,394,878.

A very important objective of the invention is to provide a dimensional cutting tool having circular saw blades located above the table surface so that it is not necessary to cut holes in the table for the blades and the table can be used for other purposes such as wood planing or molding.

It is an important objective of my invention to provide a dimensional cutting tool for wood having power drive rollers for directing the wood to the cutting blades and also for moving the wood away from the blades after cutting is completed.

Another one of the objects of my invention is to provide a dimensional cutting tool wherein the cutting head can be replaced with a planing or molding head without further modification of the tool.

It is also one of the objects of my invention to provide a dimensional cutting tool for wood wherein two or more circular saw blades can be mounted on a common shaft and moved to an infinitely variable number of positions for cutting flat wood stock either in pieces of equal width or in pieces of different width.

Other objects of my invention will be made clear or become apparent from the following description and claims when read in light of the accompanying drawing wherein:

FIG. 1 is a perspective view of the dimensional cutting tool of the present invention;

FIG. 2 is an enlarged top plan view of the shaft which mounts the circular saw blades with one of the blades being shown in broken lines moved to an alternate position;

FIG. 3 is a vertical cross-sectional view taken along line 3—3 of FIG. 2;

FIG. 4 is a side elevational view taken in the direction of arrows 4—4 of FIG. 3 with portions broken away to illustrate details of construction; and FIG. 5 is an enlarged side elevational view of one of the circular saw blades utilized with the cutting tool of the present invention.

Referring initially to FIG. 1, the dimensional cutting tool is designated generally by the numeral 10 and comprises a framework 12 that includes legs 14, skirt 16 and a flat surface presenting table 18. Table 18 is movable in a vertical direction through a ratchet and chain assembly 20 by means of a crank handle 22. Details of construction of the mechanism for moving table 18 vertically are described in greater detail in the referenced patent.

Vertical sidewalls 24 extend upwardly from framework 12 and mount a shaft 26 in spaced relationship to surface 18 through bearings 28. One end of shaft 26 receives a sheave 30 which is keyed to the shaft and over which a drive belt 32 is trained. Shaft 26 also receives a plurality of circular saw blades 34 which are mounted on the shaft by collars 36 disposed on the side of each blade.

As shown best in FIG. 5, each saw blade 34 has a central aperture 38 through which the shaft 26 passes as well as smaller holes 40 spaced around aperture 38 for receiving screws 42 (FIG. 4) which pass through holes 40 and hold the two collar sections 36 against the blade.

Each blade 34 also has a keyway 44 which receives a keeper key 46 that is also received by a slot 48 in shaft 26. A set screw 50 engages key 46 to hold collars 36 and blade 34 rigid with shaft 26.

First and second power feed rollers, which are not shown in the drawings but are described and illustrated in detail in the referenced U.S. Pat. No. 4,394,878, are disposed on opposite sides of shaft 26 for feeding flat wood stock through the machine. An electric motor (not shown) and drive belt assembly (also not shown) which are illustrated and described in detail in the referenced patent are utilized to drive the referenced feed rollers as well as the saw blade shaft 26.

When tool 10 is in use, crank handle 22 is used to turn the ratchet and chain assembly 20 so as to move the table 18 to the appropriate vertical height relative to the drive rollers and cutting blades for an appropriate thickness of wood. The width of the pieces of wood to be cut is predetermined and set screws 50 are loosened so that blades 34 may be moved along shaft 26 to the desired location for an appropriate width. One blade 34 is shown in broken lines in FIG. 2 to illustrate the feature of the invention which allows movement along the length of the shaft. It will be appreciated that blades 34 may be spaced equal distances apart as illustrated in FIG. 2 or unequal distances to give different width pieces of finished product. As a result of slot 48 extending substantially the entire length of shaft 26, there is virtually an infinitely variable number of positions for blades 34 so as to dimension flat wood stock into various widths.

A piece of flat wood stock 52 is illustrated in FIG. 1 after it has been fed into the tool and cut into five pieces designated 52a. As a result of the power feed rollers on opposite sides of cutting blades 34, the flat wood stock is precisely fed to the blades and the cut wood is pulled away from the blades so as to assure the most accurate cutting without lateral movement. By virtue of the fact that the entire feeding and cutting mechanism is covered by a protective cover 54, the danger to an operator is greatly reduced although great care must still be utilized when operating this tool. As a result of the invention, an extremely accurate and relatively safe dimensional cutting tool is provided which can be used to cut flat wood stock into two or more pieces with speed and accuracy.

I claim:

1. A dimensional cutting tool for flat wood stock, said tool comprising:
   a support framework;
   a table on said framework presenting a flat surface;

shaft means mounted on said framework in spaced relationship above said surface;

a plurality of circular saw blades removably mounted on said shaft and adapted to be variably positioned along said shaft;

means for holding said blades in a rigid relationship to said shaft in predetermined positions;

a first drive roller disposed in parallel relationship to and spaced from said shaft on one side thereof, said roller also being spaced above said flat surface;

a second drive roller disposed in parallel relationship to and spaced from said shaft on the other side thereof, said second roller also being spaced above said flat surface; and means for driving said first and second rollers and said shaft all in the same direction utilizing a common drive train, said first and second drive rollers being driven at the same speed, whereby flat wood stock placed on said surface and moved into contact with said first drive roller will be moved along said surface and cut into three or more pieces by said saw blades and subsequently further moved along said surface by said second drive roller.

2. A dimensional cutting tool as set forth in claim 1, wherein said shaft is adapted to be removed and replaced with a shaft mounting a wood planing blade.

3. A dimensional cutting tool as set forth in claim 1 wherein is included collar means adapted to be mounted on said shaft for holding said circular saw blades.

4. A dimensional cutting tool as set forth in claim 3, wherein said driving means comprises an electric motor and drive belt assembly.

5. A dimensional cutting tool for flat wood stock, said tool comprising:

a support framework;

a table on said framework presenting a flat surface;

shaft means mounted on said framework in upwardly spaced relationship to said surface, said shaft means being characterized by a slot extending substantially the length thereof;

a plurality of circular saw blades removably mounted on said shaft and adapted to be variably positioned along said shaft, each of said saw blades having a keyway for receiving a keeper key;

keeper key means adapted to be received in said keyway and said slot for maintaining said saw blades rigid with said shaft;

collar means disposed on at least one side of each of said blades;

means for holding said collar means rigid with said blade;

means for holding said collar means rigid with said key;

a first drive roller disposed in parallel relationship to and spaced from said shaft on one said thereof, said roller also being spaced above said flat surface;

a second drive roller disposed in parallel relationship to and spaced from said shaft on the other side thereof, said second roller also being spaced above said flat surface; and means for driving said first and second rollers and said shaft all in the same direction utilizing a common drive train, said first and second drive rollers being driven at the same speed, whereby flat wood stock placed on said surface and moved into contact with said first drive roller will be moved along said surface and cut into three or more pieces by said saw blades and subsequently further moved along said surface by said second drive roller.

* * * * *